(12) United States Patent
Day-Richter

(10) Patent No.: US 10,810,777 B1
(45) Date of Patent: Oct. 20, 2020

(54) FEATURE ERASURE

(71) Applicant: GOOGLE LLC, Mountain View, CA (US)

(72) Inventor: John Day-Richter, Denver, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/368,400

(22) Filed: Mar. 28, 2019

(51) Int. Cl.
  *G06T 11/60* (2006.01)
  *G06T 11/00* (2006.01)
  *G06F 9/38* (2018.01)
  *G06T 1/20* (2006.01)

(52) U.S. Cl.
  CPC ............ *G06T 11/60* (2013.01); *G06F 9/3877* (2013.01); *G06T 1/20* (2013.01); *G06T 11/001* (2013.01); *G06T 2210/52* (2013.01)

(58) Field of Classification Search
  None
  See application file for complete search history.

(56) References Cited

U.S. PATENT DOCUMENTS

| 2011/0090253 A1* | 4/2011 | Good ................ G06K 9/00671 345/633 |
| 2013/0142396 A1 | 6/2013 | Yang et al. |
| 2013/0229695 A1 | 9/2013 | Lei et al. |

FOREIGN PATENT DOCUMENTS

JP   2011120084   6/2011

OTHER PUBLICATIONS

Extended European Search Report for European Application No. 20165672.5, dated Sep. 2, 2020, 9 pages.
Hajek, "Scanning Documents from Photos Using OpenCV", 12 pages.

* cited by examiner

*Primary Examiner* — Nicholas R Wilson
(74) *Attorney, Agent, or Firm* — Dority & Manning, PA

(57) ABSTRACT

A GPU receives an image comprising an array of pixels. The image depicts features in a field of an object on a background. The features and the background contrasting with the object field, and at least a portion of the object is at the center of the image. In parallel for each particular pixel of a first plurality of the pixels, the GPU sets the color value of the particular pixel to the lightest color value of a second plurality of the pixels substantially along a line outward from the particular pixel toward an edge of the image. The line can be defined by the particular pixel and the image center.

20 Claims, 10 Drawing Sheets

300

Receive, by a GPU, an image comprising an array of pixels, the image depicting features in a field of an object on a background, the features and the background contrasting with the object field, and at least a portion of the object at the center of the image
310

In parallel for each particular pixel of a first plurality of the pixels, set, by the GPU, the color value of the particular pixel to the lightest color value of a second plurality of the pixels substantially along a line outward from the particular pixel toward the edge of the image, the line defined by the particular pixel and the image center
320

FIG. 3

FEATURE ERASURE

TECHNICAL FIELD

The technology disclosed herein is related to graphics processing. Particular examples relate to erasing features (such as text and signatures) on contrasting fields of objects (such as light-colored fields of receipts) placed on backgrounds darker than the object fields (such as a wooden tabletops), using graphics processing units (GPUs).

BACKGROUND

A GPU is an electronic subsystem (typically a chipset) designed to rapidly process images intended for output to a display device. GPUs are used in embedded systems, mobile phones, personal computers, workstations, digital cameras, game consoles, and other digital systems. The highly parallel structure of the GPU makes it more efficient than a general-purpose central processing unit (CPU) for certain tasks.

A "shader" is a type of computer program that was originally used for shading (that is, the production of appropriate levels of light, darkness, and color within an image), but which now can perform a variety of specialized functions in various fields of computer graphics. Shading languages may be used to program a GPU rendering pipeline. The position, hue, saturation, brightness, and contrast of pixels, vertices, or textures used to construct an output image can be altered on the fly, using algorithms defined in the shader, and can be modified by external variables or textures introduced by the program calling the shader.

SUMMARY

The technology described herein includes computer implemented methods, computer program products, and systems to erase features in fields of objects placed on backgrounds in images. In some examples of the technology, a GPU receives an image comprising an array of pixels. The image depicts features in a field of an object on a background. The features and the background contrasting with the object field, and at least a portion of the object is at the center of the image. In parallel for each particular pixel of a first plurality of the pixels, the GPU sets the color value of the particular pixel to the lightest color value of a second plurality of the pixels substantially along a line outward from the particular pixel toward an edge of the image. The line is defined by the particular pixel and the image center.

In some examples, a pixel is substantially along the line where the pixel is within a predetermined distance from the line. In some examples the second plurality of pixels comprises a predetermined number of pixels uniformly spaced along the line.

In some examples, receiving an image includes instructing, by a device containing the GPU, a user of the device to position at least a portion of the object over the center of an imaging screen of the device before capturing the image. The captured image is then received.

In some examples, the line extends a predetermined distance from the particular pixel toward the edge of the image. In some examples, the features and the background are each darker than the object field. In some examples the lightness of a color value is determined by converting the value of a pixel from the received image to a grayscale value, wherein grayscale values closer to white correspond to lighter.

BRIEF DESCRIPTION OF THE DRAWINGS

FIG. 3 is a block diagram illustrating methods to erase features in fields of objects placed on backgrounds in images, in accordance with certain examples of the technology disclosed herein.

DETAILED DESCRIPTION OF THE EXAMPLES

In document scanning applications, it is usually necessary to find the edges of the document to be scanned. Document edge detection in images typically is done by finding local regions of the image with large differences in color or lightness—counting on the document field to be lighter than both the document features (for example, text and signatures) and the image background (for example, a non-white table top). However, documents present a problem for this sort of edge detection, in part because the strongest edges in a document may be found between the document field the document features. Document features such as text are meant to contrast sharply with the document field. Edge detection for documents can be made much simpler if there is a way of reliably erasing the document text while preserving the contrast between the document edges and the background behind the document. The present disclosure refers to "objects" as a generalization of "documents" to include objects such as labels affixed to products.

Examples of the technology disclosed herein erase features, such as text, that present high contrast with the object field in images on a GPU, in some instances in a small number O(log N) of fast GPU passes—where "O(*)" represents "on the order of" and "N" is the number of pixels processed. The results are available to other GPU-implemented processes of the image processing pipeline without having to copy the results between the GPU, Central Processing Unit (CPU), and system memory. Such copying is a relatively expensive operation that may introduce undesirable latency in real-time image processing applications. The technology can be employed to perform image processing tasks in a way that makes use of the computing device's resources more efficient.

Example System Architectures

Figure 1:
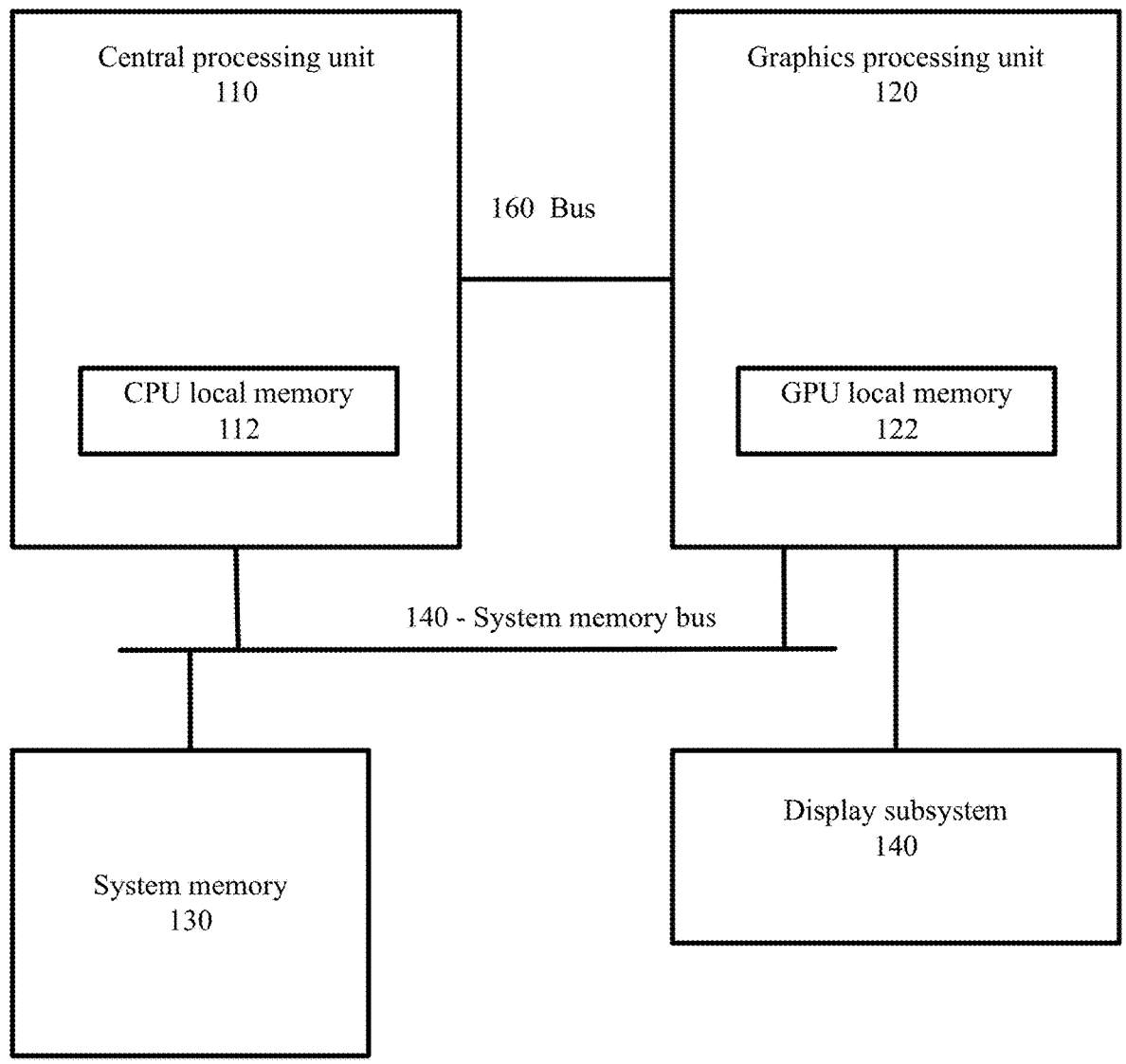
FIG. 1 is a block diagram depicting a portion of a simplified communications and processing architecture of a typical device offering a graphical user interface (GUI), in accordance with certain examples of the technology disclosed herein.

FIG. 1 is a block diagram depicting a portion of a simplified communications and processing architecture 100 of a typical device offering a graphical user interface (GUI), in accordance with certain examples of the technology disclosed herein. While each element shown in the architecture is represented by one instance of the element, multiple instances of each can be included. While certain aspects of operation of the present technology are presented in examples related to FIG. 1 to facilitate enablement of the claimed invention, additional features of the present technology, also facilitating enablement of the claimed invention, are disclosed elsewhere herein.

In such an architecture 100, a central processing unit (CPU) 110 and a graphics processing unit (GPU) 120 share access to system memory 130 via a system memory bus 140. The CPU 110 and the GPU 120 communicate messages and data over a bus 160 that may also connect to other processors, sensors, and interface devices (not shown). Each of CPU 110 and GPU 120 include local memory (CPU local memory 112, GPU local memory 122). Shaders used in examples of the technology disclosed herein can be stored in GPU local memory 122, along with input data to the shaders and output data from the shaders. Local memory can include cache memory. Cache memory stores data (or instructions, or both) so that future requests for that data can be served faster; the data stored in a cache might be the result of an earlier computation or a copy of data stored elsewhere. A cache hit occurs when the requested data can be found in a cache, while a cache miss occurs when it cannot. Cache hits are served by reading data from the cache, which typically is faster than recomputing a result or reading from a slower data store such as system memory 130 or transfer between the CPU 110 and GPU 120. Thus, the more requests that can be served from the cache, the faster the system performs. The GPU 120 typically operates on data from local memory to drive display subsystem 140. Display subsystem 140 can be an output-only subsystem or an interactive display subsystem 140. Throughout the discussion of examples, it should be understood that the terms "data" and "information" are used interchangeably herein to refer to text, images, audio, video, or any other form of information that can exist in a computer-based environment.

The architecture 100 illustrated is an example, and other means of establishing a communications link between the functional blocks can be used. Moreover, those having ordinary skill in the art having the benefit of the present disclosure will appreciate that the elements illustrated in FIG. 1 may have any of several other suitable computer system configurations. For example, the architecture 100 may be embodied as a mobile phone or handheld computer and may not include all the components described above.

Figure 10:
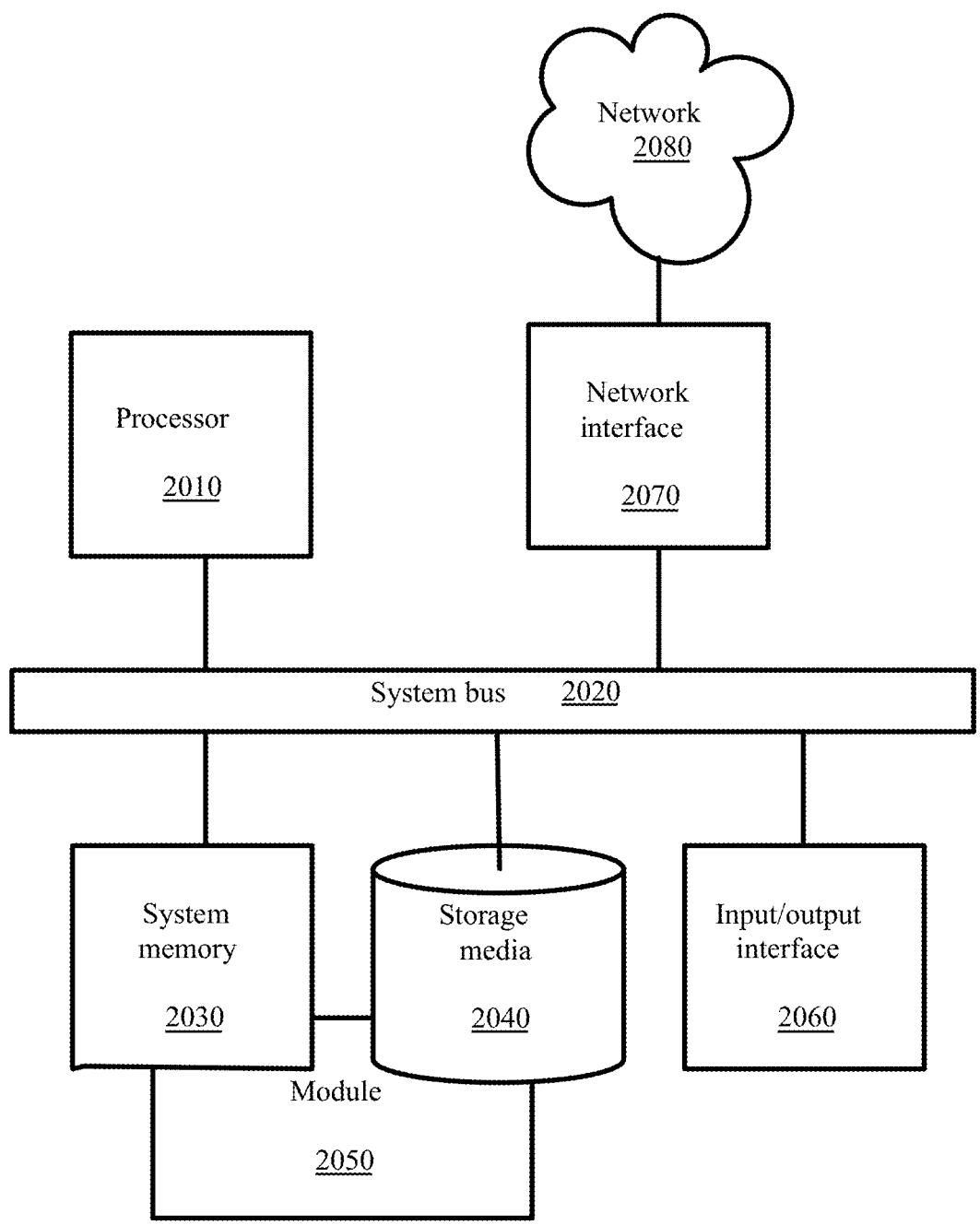
FIG. 10 is a block diagram depicting a computing machine and modules, in accordance with certain examples.

In examples the technology presented herein may be part of any type of computing machine such as, but not limited to, those discussed in more detail with respect to FIG. 10. Furthermore, any modules associated with any of these computing machines, such as modules described herein or any other modules (scripts, web content, software, firmware, or hardware) associated with the technology presented herein may be any of the modules discussed in more detail with respect to FIG. 10. The computing machines discussed herein may communicate with one another as well as other computer machines or communication systems over one or more networks. The network may include any type of data or communications network, including any of the network technology discussed with respect to FIG. 10.

Example Processes

The example methods illustrated in the figures are described hereinafter with respect to the components of the example architecture 100. The example methods also can be performed with other systems and in other architectures involving a GPU 120. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a GPU 120 implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.) by a GPU 120.

Figure 2:
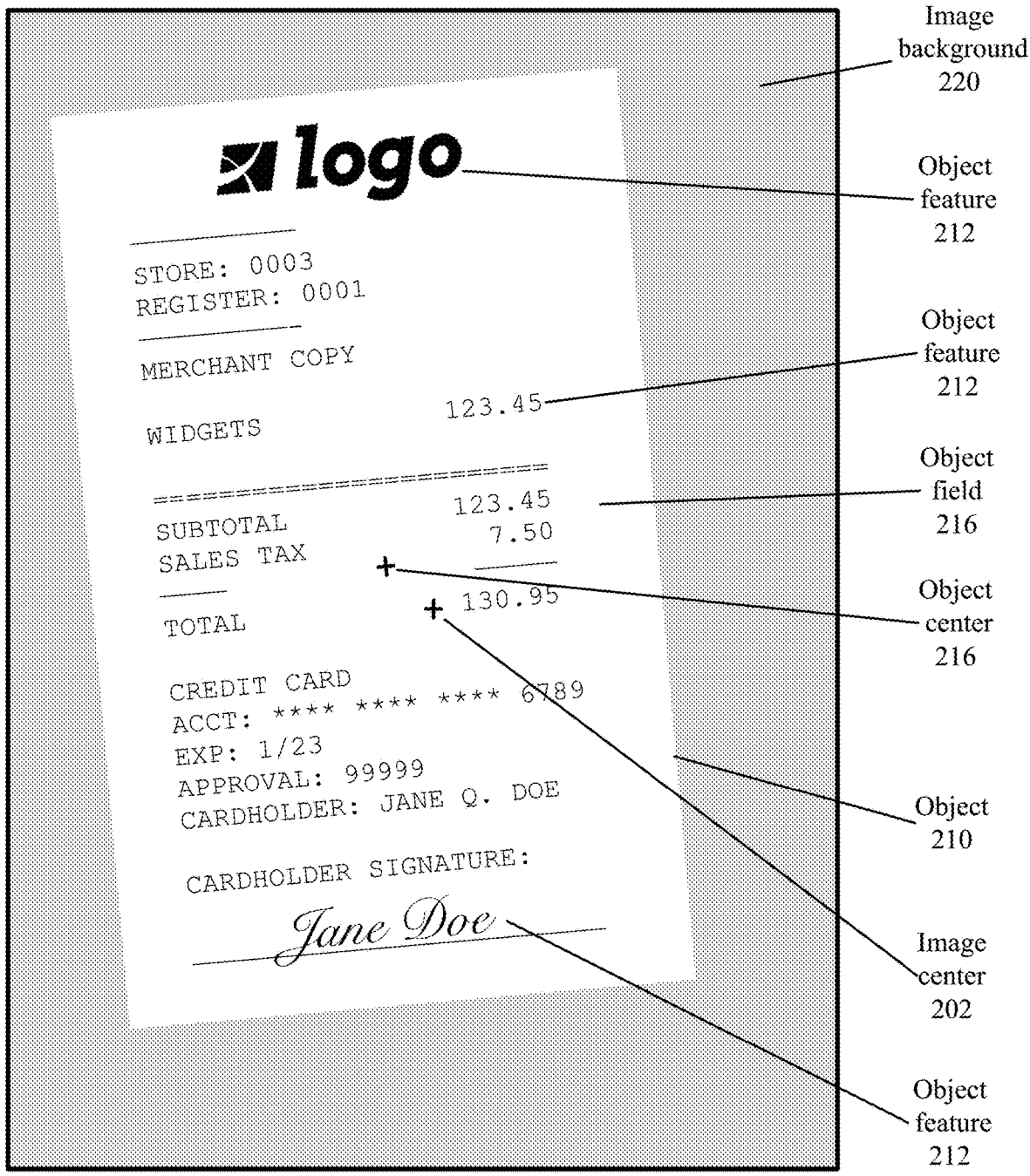
FIG. 2 is a representation of an example image of an object (a receipt) upon which the technology disclosed herein operates, in accordance with certain examples of the technology disclosed herein.

Referring to FIG. 2, and continuing to refer to FIG. 1 for context, a representation of an example image of an object (a receipt) upon which the technology disclosed herein operates, in accordance with certain examples of the technology disclosed herein. The image 200 is of an object 210, such as a document, a receipt, a product label, a bar code, or any other object of interest. The object 210 sits upon an image background 220, for example a table top, a desktop, or a merchant's counter. The object 210 includes object features 212 such as text, a logo, or a signature (shown in FIG. 1 as examples). Other object features 212 in an image 200 can include smudges, folds, creases, stains, stamps, etc. The object features 212 sit in an object field 214 (typically a light color). Note that both the object features 212 and the image background 220 contrast with the object field 214.

In a continuing example, the image 200 is of a credit card receipt 210 sitting on a merchant's counter 220. The features 212 are receipt data including a logo, alphanumeric information (for example, "STORE: 0003," "ACCT," and "EXP: 1/23"), and the customer's signature. Note that the object center 216 and the image center 202 are not in the same place and that the object tilts slightly with respect to the image. Also note that at least a portion of the object 210 is over the image center 202.

Referring to FIG. 3, and continuing to refer to prior figures for context, methods 300 to erase object features in fields of objects placed on backgrounds in images are illustrated in accordance with certain examples. In such methods 300, a GPU 120 receives an image 200, comprising an array of pixels, that depicts object features 212 in a field 214 of an object 210 on an image background 220-Block 310. The object features 212 and the image background 220 contrast with the object field 214, and at least a portion of the object 210 is at the image center 202.

The image 200 is composed of a two-dimensional array of pixel color values. For example, the color of a pixel can be represented by a vector having components for red, blue, and green color intensities of the pixel. Examples disclosed herein operated on input images of the OpenGL® "RGBA"

format but are not restricted to that format. OpenGL is a cross-language, cross-platform application programming interface (API) for rendering graphics. The API is typically used to interact with a GPU 120 to achieve hardware-accelerated rendering. OpenGL enables the use of programs called "shaders" to manipulated images. In addition to 8-bit values for each of red, green, and blue, the OpenGL RGBA format uses an 8-bit "A," or "alpha," component. The 8-bit format provides 256 discrete values from "0" to "255" for each pixel. The alpha component is typically used to represent the transparency of a pixel. Considering the RGBA format as defining a vector space, colors closer to (0, 0, 0, X) in the vectors space are considered "darker" than colors closer to (255, 255, 255, X). As another example, lightness=A×(R+B+G)/3 can be used. In this example, the technology uses the average value of the R, G, and B channels, and multiplies it by the value of the A channel. This function treats the pixel as if it is sitting on a black background. The lower the alpha value (that is, the more transparent the pixel is), the lower (darker) the lightness value.

In OpenGL, color values can be stored in one of three ways: normalized integers, floating-point, or integral. Both normalized integer and floating-point formats will resolve, in a shader, to a vector of floating-point values; whereas integral formats will resolve to a vector of integers. Examples presented herein use the integral format for each of "R," "B," "G," and "A." While the OpenGL RGBA format can represent virtually any color of pixel, examples disclosed herein operate on "grayscale" images. In the OpenGL RGBA format, grayscale pixel values are represented by R=B=G, with any applicable A. For example, the pixel value (127, 127, 127, A) represents a solid (A=max, solid) medium gray, the pixel value (0, 0, 0, A) represents solid black, and the pixel value (255, 255, 255, A) represents solid white.

Figure 4:
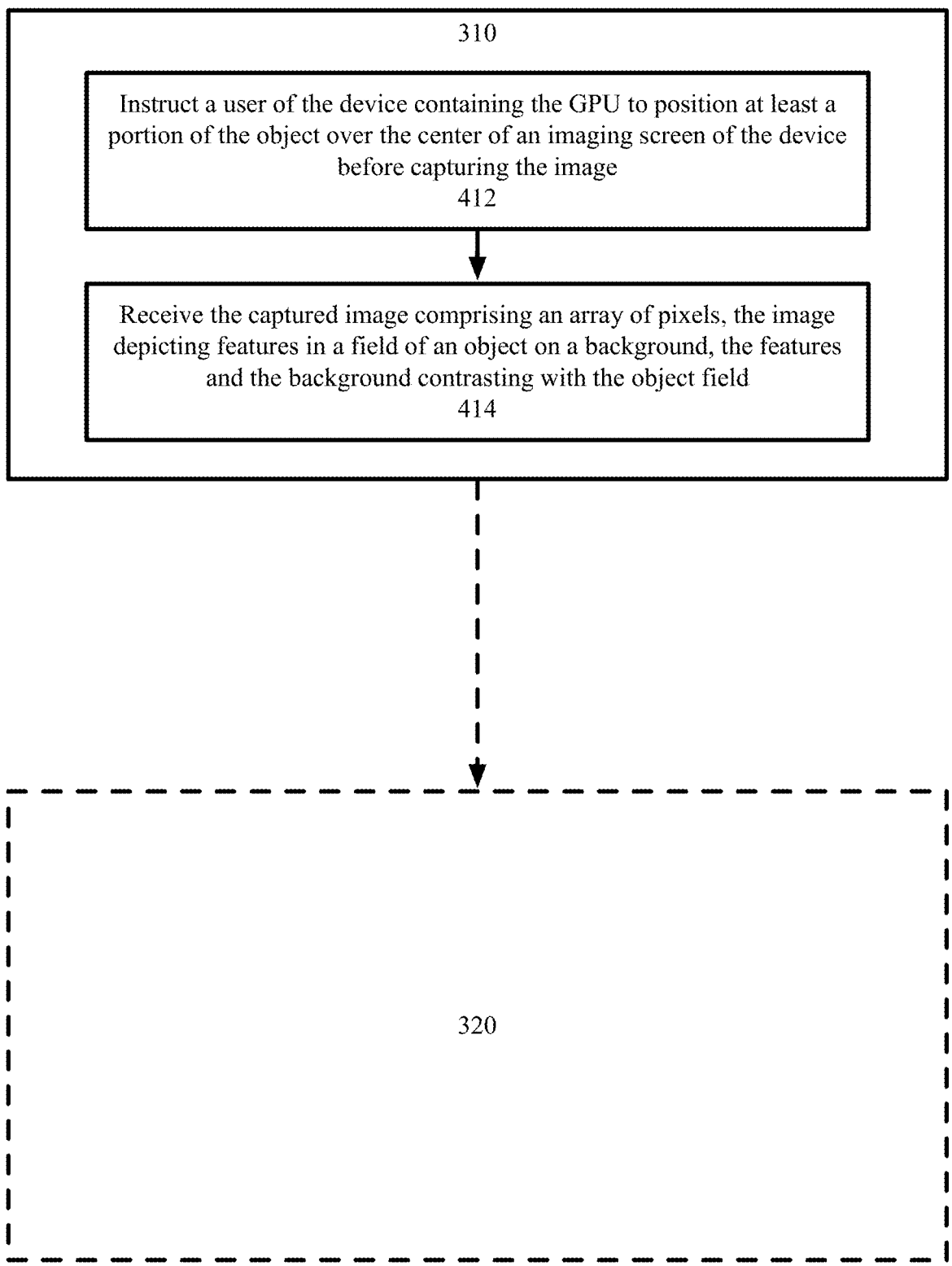
FIG. 4 is a block diagram illustrating methods for receiving, by a GPU, an image, comprising an array of pixels, that depicts object features in a field of an object on an image background, with at least a portion of the object is at the image center are shown, in accordance with certain examples of the technology disclosed herein.

Referring to FIG. 4, and continuing to refer to prior figures for context, methods 400 for receiving, by a GPU, an image, comprising an array of pixels, that depicts object features in a field of an object on an image background, with at least a portion of the object is at the image center are shown, in accordance with certain examples. In such examples, the device hosting the GPU 120 instruct a user of the device to position at least a portion of the object over the center of an imaging screen of the device before capturing the image—Block 412. For example, an application running on the device CPU 110 instructs the user to position a receipt 210 such that, while the receipt 210 may be tilted with respect to the overall image 200 (as in the continuing example), some portion of the receipt is at the center of the imaging screen of the device when the image 200 is taken. In yet a further variation on the technology disclosed herein, the device instructs the user to provide, and receives from the user, an indication of at least one point in the image 200 that contains the object 210. In such examples, the GPU then receives the captured image comprising an array of pixels, the image depicting features in a field of an object on a background, the features and the background contrasting with the object field—Block 414.

Figure 5:
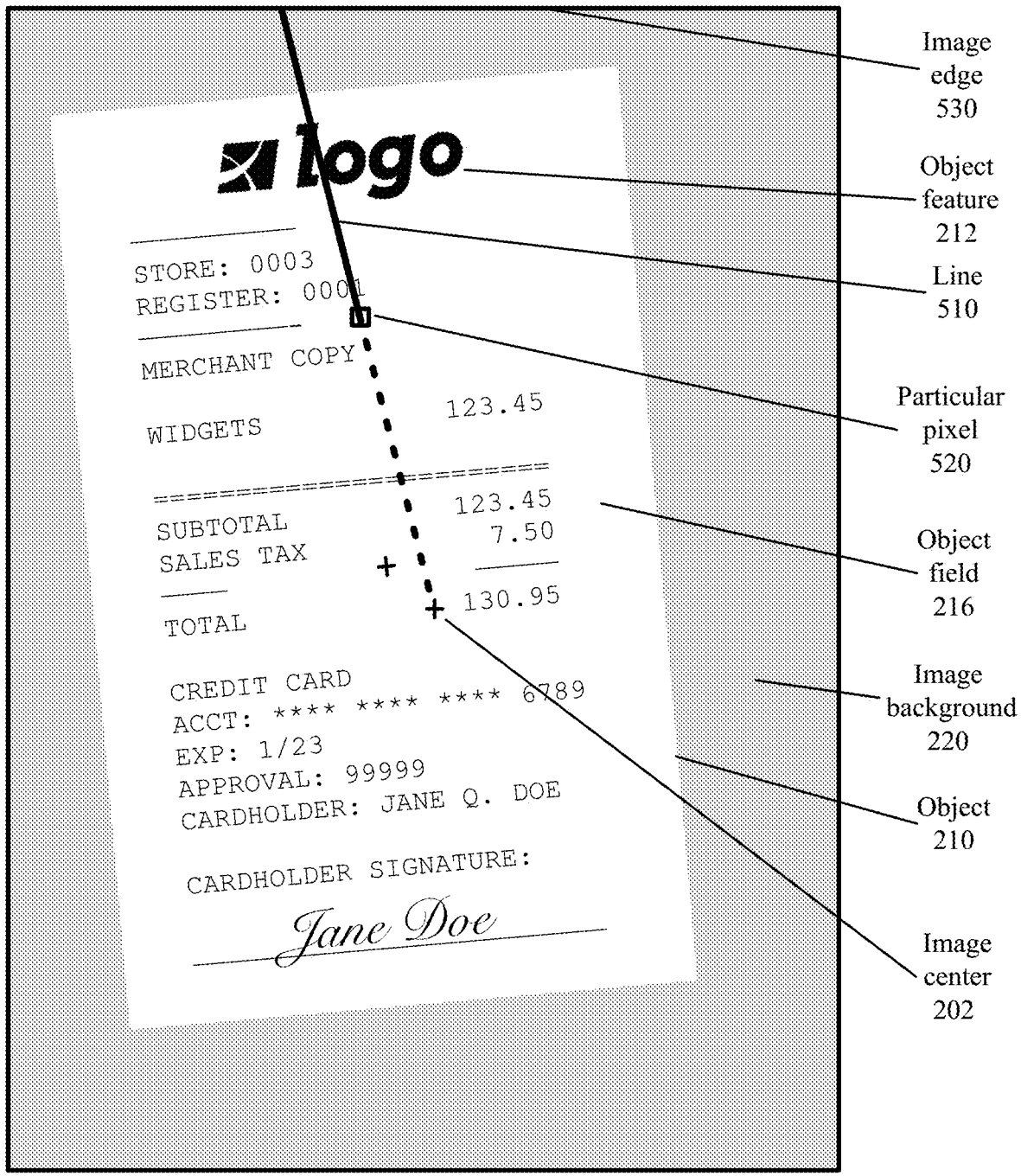
FIG. 5 illustrates an image of the receipt with a line drawn from the image center through a particular pixel, in accordance with certain examples of the technology disclosed herein.

Referring again to FIG. 3, in parallel for each particular pixel of a first plurality of the pixels, using a shader the GPU sets the color value of the particular pixel to the lightest color value of a second plurality of the pixels substantially along a line outward from the particular pixel toward an edge of the image, the line defined by the particular pixel and the image center—Block 320. Referring to FIG. 5, and continuing to refer to previous figures for context, an image 200 of the receipt 210 of FIG. 2 is shown with a line 510 drawn from the image center 202 through a particular pixel 520, in accordance with certain examples of the technology disclosed herein.

In the continuing example, the size of the particular pixel 520 is exaggerated for ease of illustration, as is each other pixel illustrated in the drawings. The portion of line 510 extending outward from the particular pixel 520 toward the top image edge 530 is shown in FIG. 5 as solid and with non-zero thickness. Note that the solid portion of the line 510 passes: (i) through (255, 255, 255, A) white pixels (not explicitly shown in FIG. 5), for example, between the "REGISTER: 0001" line and the "logo;" (ii) through (0, 0, 0, A) black pixels (not explicitly shown in FIG. 5), for example, in the "1" of "logo;" and (iii) through (127, 127, 127, A) gray pixels (not explicitly shown in FIG. 5), for example, in the image background 220.

Figure 6:
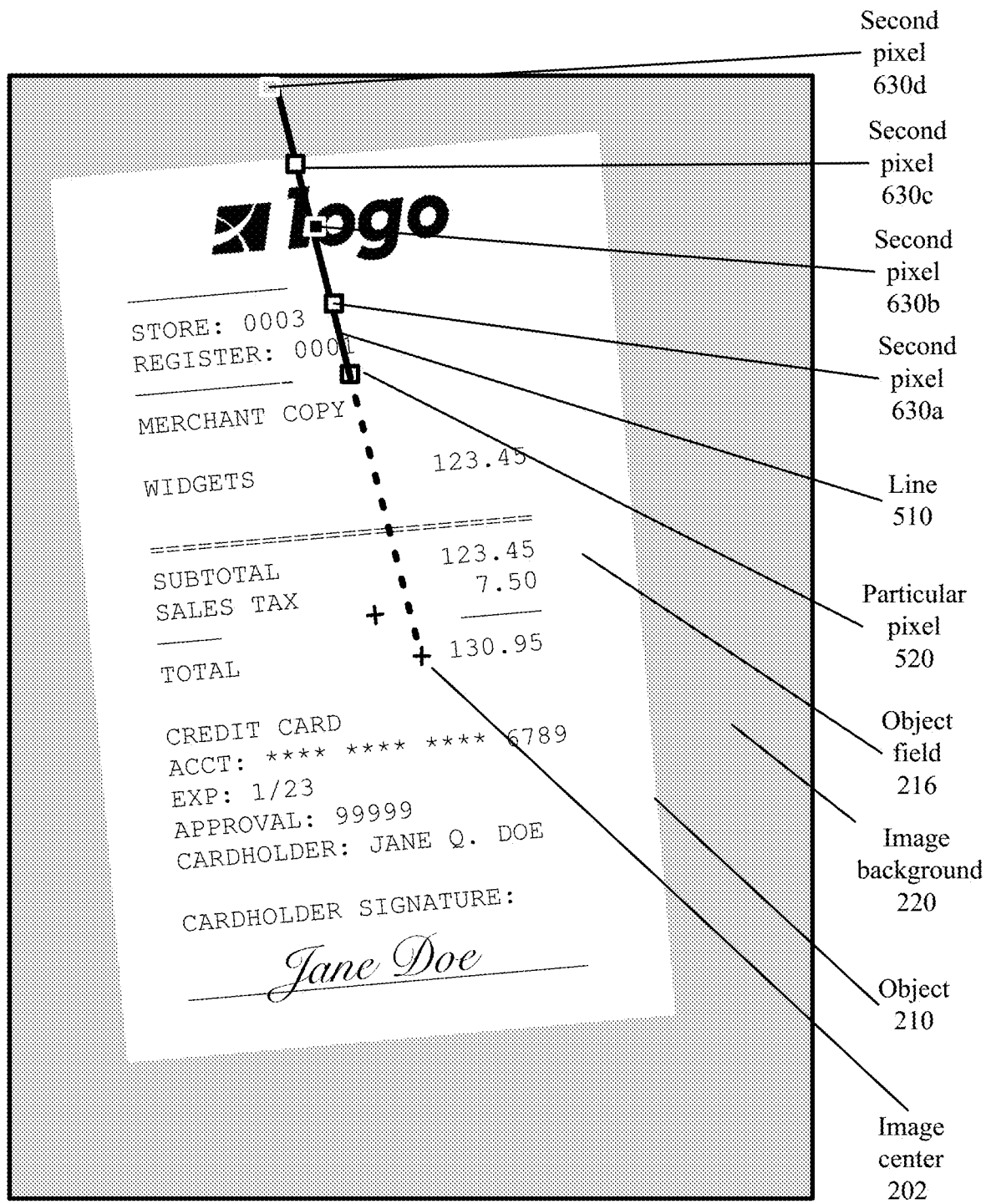
FIG. 6 illustrates an image of the receipt with a line drawn from the image center through a particular pixel, in accordance with certain examples of the technology disclosed herein.

Referring to FIG. 6, and continuing to refer to previous figures for context, an image 200 of the receipt 210 of FIG. 2 is shown with pixels 630a-630d from a second plurality of pixels distributed substantially along line 510 outward from particular pixel 520 through particular pixel 520 and the image center 202, in accordance with certain examples of the technology disclosed herein. The initial color of second plurality pixel 630a is (255, 255, 255, A) white given that pixel 630a is part of the object field 216. The initial color of second plurality pixel 630b just to the right of line 510 is (0, 0, 0, A) black-though in this case, the color of the horizontally adjacent pixel directly on the line is also (0, 0, 0, A) black given that pixel 630b is part of the first "o" of "logo." The initial color of second plurality pixel 630c on line 510 just inside the edge of the receipt 210 is (255, 255, 255, A) white. The initial color of second plurality pixel 630d just to the left of line 510 just inside the edge of the image 200 in the image background 220 is (127, 127, 127, A) gray. In FIG. 6, the pixel outline for non-white pixels is illustrated as white, while the pixel outline for white pixels is illustrated as black. The outlines are shown for illustration purposes and are not part of an actual pixel. The GPU 120 sets the color value of the particular pixel 520 to the lightest color value of pixels 630a-630d. In the continuing example, that color remains (255, 255, 255, A) white because particular pixel 520 is already at the lightest color of pixels sampled outward from pixel 520 along a line that includes pixel 520 and the image center 202.

Figure 7:
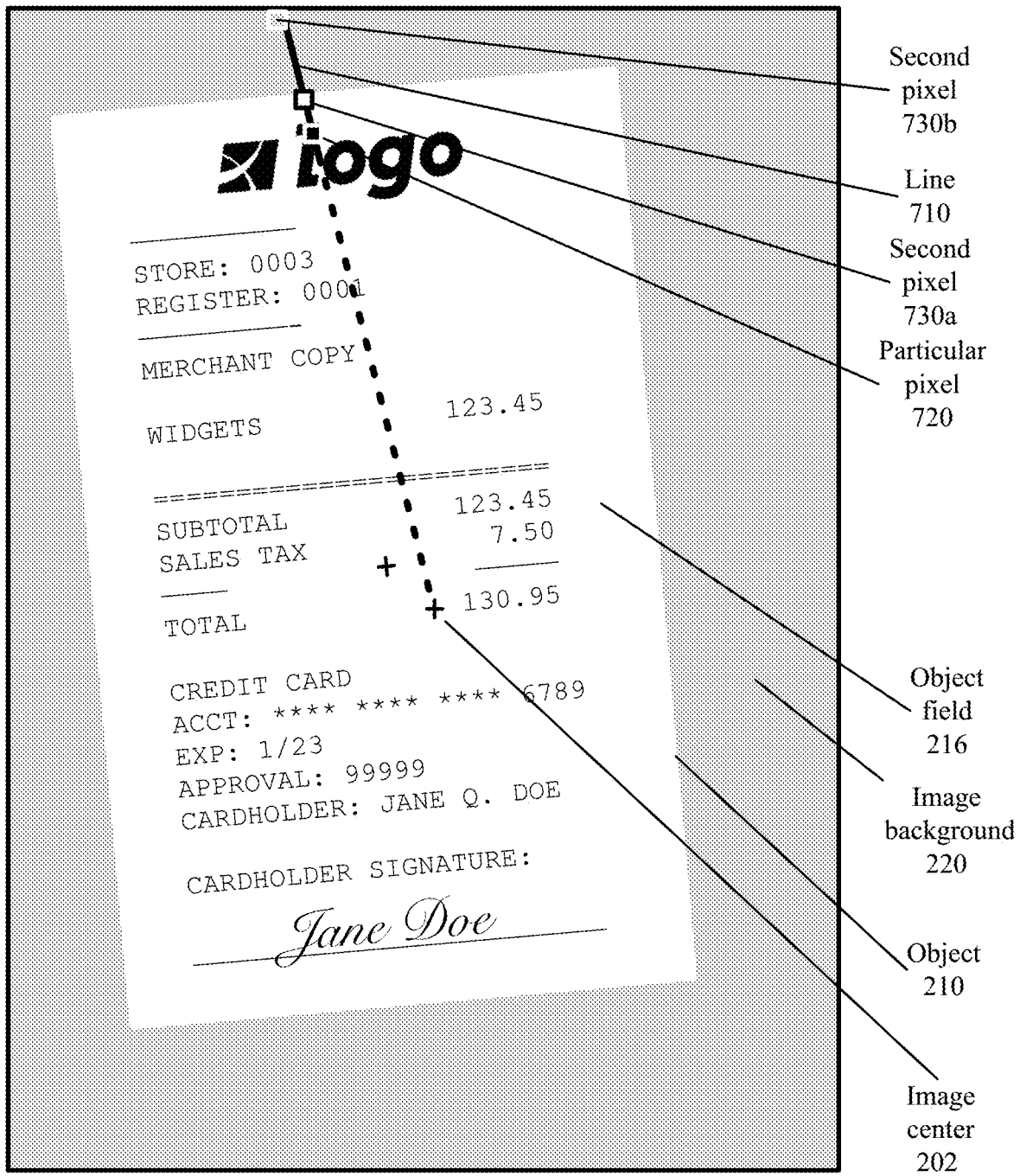
FIG. 7 illustrates an image of the receipt with a line drawn from the image center through a particular pixel, in accordance with certain examples of the technology disclosed herein.
Figure 8:
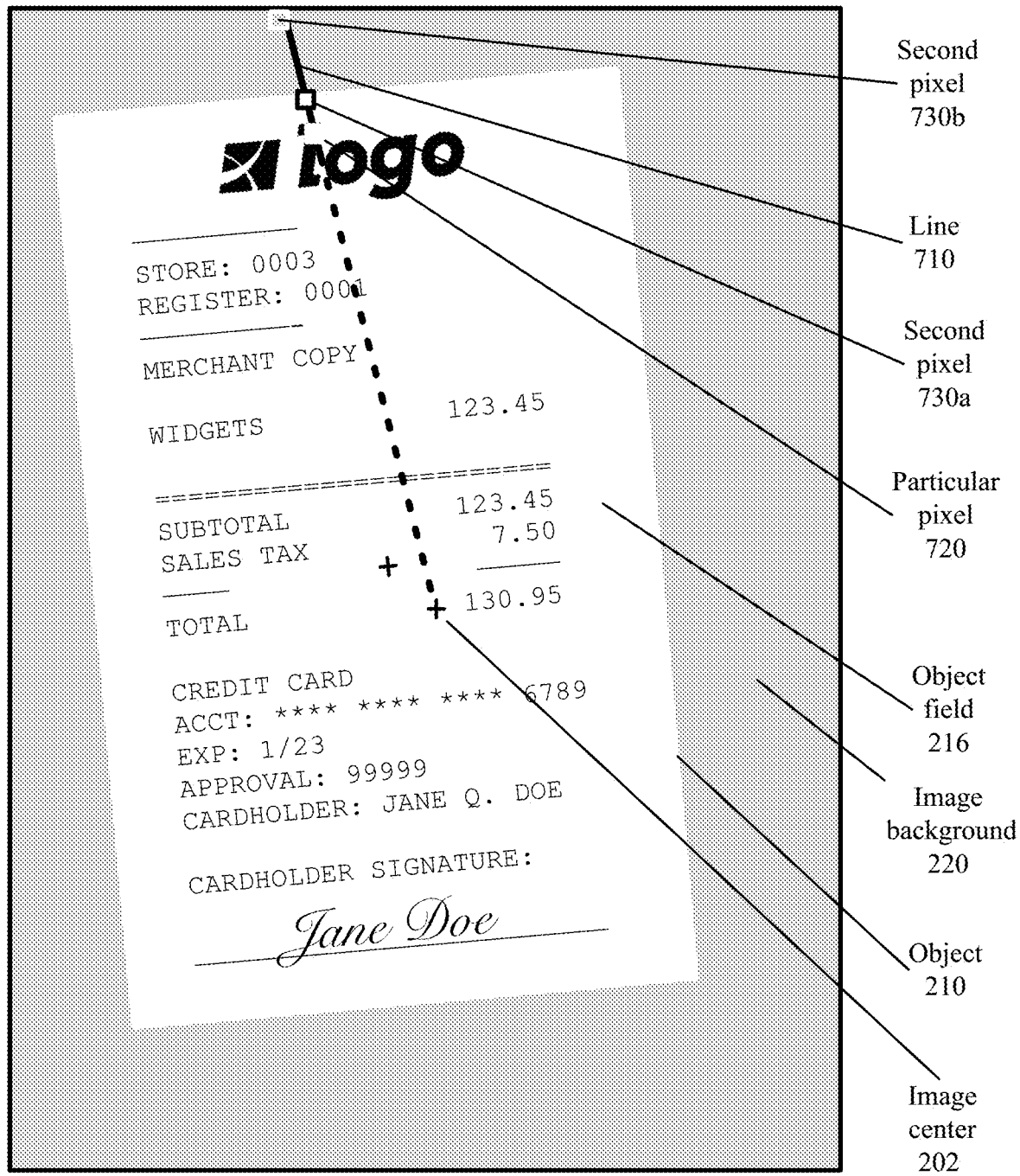
FIG. 8 illustrates an image of the receipt with the particular pixel of FIG. 7 changed to the lightest color along a line extending outward from the particular pixel through the center of the image, in accordance with certain examples of the technology disclosed herein.
Figure 9:
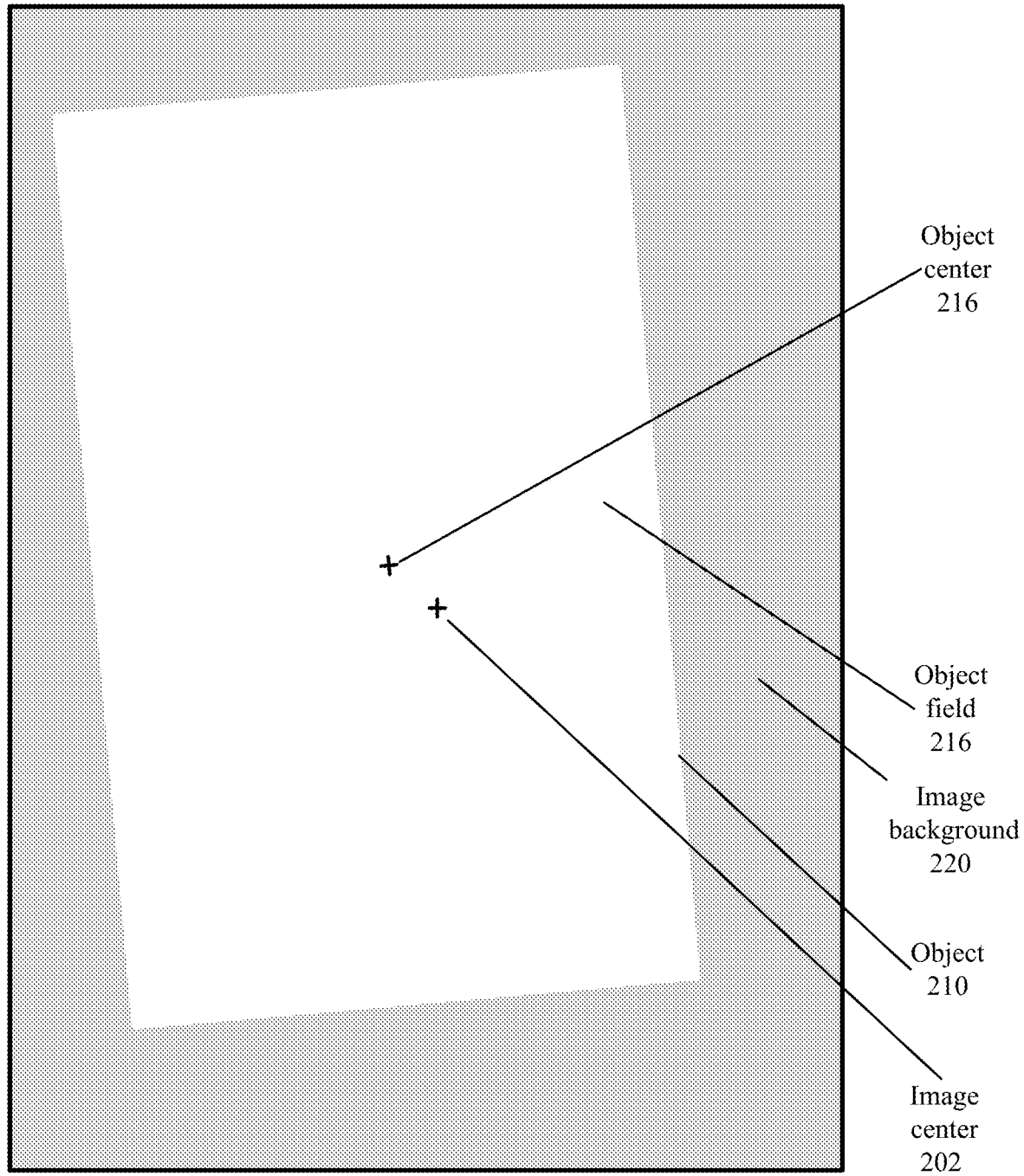
FIG. 9 illustrates an image of the receipt with object features erased, in accordance with certain examples of the technology disclosed herein.

Referring to FIG. 7, and continuing to refer to previous figures for context, an image 200 of the receipt 210 of FIG. 2 is shown with pixels 730a-730b from a second plurality of pixels distributed substantially along line 510 outward from particular pixel through the particular pixel and the image center 202, in accordance with certain examples of the technology disclosed herein. The initial color of second plurality pixel 730a is (255, 255, 255, A) white given that pixel 730a is part of the object field 216. The initial color of second plurality pixel 730d just to the left of line 510 just inside the edge of the image 200 in the image background 220 is (127, 127, 127, A) gray. The GPU 120 sets the color value of the particular pixel 720 to the lightest color value of pixels 730a-730b. In the continuing example, that color is changed from (0, 0, 0, A) black to (255, 255, 255, A) white because second plurality pixel 730a is the lightest color, (255, 255, 255, A) white, of pixels sampled outward from particular pixel 720 along a line that includes particular pixel 720 and the image center 202. FIG. 8 illustrates particular pixel 720 changed to (255, 255, 255, A) white. FIG. 9 illustrates an image of the receipt 210 with object features erased, in accordance with certain examples of the technology disclosed herein, after each particular pixel the image has been processed. The technology described herein is less computationally intensive and faster than other kernel-based methods, thereby reducing computational burden and latency in image processing over such methods.

Each of the operations described above for the particular pixel are performed in parallel by the GPU for each of the first plurality of pixels. In some examples, the first plurality of pixels is the entirety of pixels in the image. In other examples, less than all the pixels in the image are processed in a first parallel group.

As can be seen from the continuing example, with even a small number of second plurality pixels sampled outward along a line (or near the line) that includes the image center 202 and a particular pixel, each particular pixel in object 210 will be set to (255, 255, 255, A) white, and each particular pixel outside object 210 in image background 220 will be set to (127, 127, 127, A) gray.

While the image center presents a straightforward reference point (that can be readily determined once) to define a line that intersects the image edge along with any particular point, any point that is inside the object 210 can serve the same purpose as the image center. Such a point can be solicited from a device user via the display system 140.

While a small number of second plurality points were used in the continuing example for ease of illustration, sixteen second plurality points evenly spaced along the line have proven enough to erase object features to a practical extent that facilitates object edge detection. Increasing the number of points, using a distribution of sampled second plurality points other than evenly space may increase the degree of erasure, but would also increase the processing required and thus introduce latency without a substantial gain in effectiveness.

Various methods of determining the "lightness" of a given pixel can be used with the technology disclosed herein without substantially changing the effectiveness of the technology. For example, cosine distance in the vector space between a given color and (255, 255, 255, A) white can be used to determine lightness, or the sum of the R, G, and B channels can be used, with higher sums being considered lighter. In some examples, the lightness of a color value is determined by converting the value of a pixel from the received image to a grayscale value, wherein grayscale values closer to white correspond to lighter. While the continuing example is directed to grayscale colors, the technology disclosed herein works with images having other colors in the RGBA spectrum.

The distance between the line and a sampled pixel can be limited to a predetermined distance, which can be measured in physical distance based on the full size of the image, or as pixels (either horizontally, vertically, or a combined function thereof). In some example of the technology disclosed herein, all second plurality pixels are directly on line 510.

While in the continuing example, the features and the background are each darker than the object field, the technology disclosed herein can work in the obverse—meaning on objects with fields darker than the object fields and image background. In such cases, each particular pixel is set to the darkest pixel sampled on the line toward the image edge.

While in the continuing example the line containing the particular pixel and the image center 202 extends outward to the edge of the image 200, in other examples the line extends a predetermined distance less than to the edge of the image, or a predetermined proportion of the distance toward the edge of the image 200. For example, for text erasure, roughly twice the expected height of the text characters in pixel can be used for the predetermined distance. The precise value depends on the expected text size, the camera resolution, and the camera's expected distance from the document.

Other Examples

FIG. 10 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

For example, note that at least some of the parallelism in examples of the technology disclosed herein is driven by the output image, not the input image. The GPU can determine each output pixel in parallel. For each output pixel, the technology samples a number of input pixels. However, there are options for speeding up the calculation based on heuristics. For example, by assuming that there is a 20-pixel margin around the object at least two options are available.

In a first option, the technology does a simple computation for the pixels that satisfy the heuristic. For example, turn those pixels the same color as the corresponding pixel at the edge of the 20-pixel border. That's only one sampling operation of input pixel, rather than multiple, and the math to figure out which pixel to sample is simple. In practice, the technology can gain speed this way, because the typical GPU does not process all the output pixels at once; it processes them in batches. If the heuristic operates so that every pixel in a batch was processed quickly, that batch would be fast, speeding up the whole computation. GPU manufacturers can choose whatever batching strategy they want, so results can vary from manufacturer to manufacturer. In a second option, the technology crops the image in a prior step before processing it as described above. This is the best way to ignore some part of the image.

The invention claimed is:

1. A computer-implemented method to erase features in fields of objects placed on backgrounds in images, comprising:
    in a graphics processing unit (GPU):
        receiving an image comprising an array of pixels, the image depicting features in a field of an object on a background, the features and the background contrasting with the field of the object, and at least a portion of the object at a center of the image; and
        in parallel for each particular pixel of a first plurality of pixels of the array of pixels, setting a color value of the particular pixel to a lightest color value of a second plurality of pixels of the array of pixels along a line outward from the particular pixel toward an edge of the image, the line defined by the particular pixel and the center of the image.

2. The method of claim 1, wherein the second plurality of pixels includes pixels of the array of pixels that are along the line outward from the particular pixel toward the edge of the image or within a predetermined distance from the line.

3. The method of claim 1, wherein the second plurality of pixels of the array of pixels comprises a predetermined number of pixels uniformly spaced along the line.

4. The method of claim 1, wherein receiving an image comprises:
    instructing, by a device containing the GPU, a user of the device to position at least a portion of the object over a center of an imaging screen of the device before capturing the image; and
    receiving, by the GPU, the image comprising the array of pixels, the image depicting features in a field of an object on a background, the features and the background contrasting with the field of the object.

5. The method of claim 1, wherein the line extends a predetermined distance from the particular pixel toward the edge of the image.

6. The method of claim 1, wherein the features and the background are each darker than the field of the object.

7. The method of claim 1, wherein a lightness of the color value of each pixel of the second plurality of pixels is determined by converting the color value of such pixel of the second plurality of pixels to a grayscale value, wherein grayscale values closer to white correspond to lighter.

8. A computer program product, comprising:
    a non-transitory computer-readable storage device having computer-executable program instructions embodied thereon that when executed by a graphic processing unit (GPU) cause the GPU to erase features in fields of objects placed on backgrounds in images, the instructions comprising instructions to:
        receive an image comprising an array of pixels, the image depicting features in a field of an object on a background, the features and the background contrasting with the field of the object, and at least a portion of the object at a center of the image; and
        in parallel for each particular pixel of a first plurality of pixels of the array of pixels, set a color value of the particular pixel to a lightest color value of a second plurality of pixels of the array of pixels along a line outward from the particular pixel toward an edge of the image, the line defined by the particular pixel and the center of the image.

9. The computer program product of claim 8, wherein the second plurality of pixels includes pixels of the array of pixels that are along the line outward from the particular pixel toward the edge of the image or within a predetermined distance from the line.

10. The computer program product of claim 8, wherein the second plurality of pixels of the array of pixels comprises a predetermined number of pixels uniformly spaced along the line.

11. The computer program product of claim 8, wherein the line extends to the edge of the image.

12. The computer program product of claim 8, wherein the line extends a predetermined distance from the particular pixel toward the edge of the image.

13. The computer program product of claim 8, wherein the features and the background are each darker than the field of the object.

14. The computer program product of claim 8, wherein a lightness of the color value of each pixel of the second plurality of pixels is determined by converting the color value of such pixel of the second plurality of pixels to a grayscale value, wherein grayscale values closer to white correspond to lighter.

15. A system to erase features in fields of objects placed on backgrounds in images, the system comprising:
   memory;
   an interactive display subsystem coupled to the memory;
   a CPU coupled to the memory, wherein the CPU executes instructions stored in the memory to cause the system to receive an indication of a reference point on an object in an image displayed in the display subsystem; and
   a GPU coupled to the memory, wherein the GPU executes instructions that are stored in the memory to cause the system to:
      receive, the image comprising an array of pixels, the image depicting features in a field of the object on a background, the features and the background contrasting with the field of the object; and
      in parallel for each particular pixel of a first plurality of pixels of the array of pixels, set a color value of the particular pixel to a lightest color value of a second plurality of pixels of the array of pixels along a line outward from the particular pixel toward an edge of the image, the line defined by the particular pixel and the reference point.

16. The system of claim 15, wherein the second plurality of pixels includes pixels of the array of pixels that are along the line outward from the particular pixel toward the edge of the image or within a predetermined distance from the line.

17. The system of claim 15, wherein the second plurality of pixels of the array of pixels comprises a predetermined number of pixels uniformly spaced along the line.

18. The system of claim 15, wherein the line extends to the edge of the image.

19. The system of claim 15, wherein the line extends a predetermined distance from the particular pixel toward the edge of the image.

20. The system of claim 15, wherein the features and the background are each darker than the field of the object.

* * * * *